US011558794B2

(12) United States Patent
Balasubramanian et al.

(10) Patent No.: US 11,558,794 B2
(45) Date of Patent: Jan. 17, 2023

(54) DE-PRIORITIZING LTE ANCHOR CELL BASED ON NR CELL MEASUREMENTS

(71) Applicant: APPLE INC., Cupertino, CA (US)

(72) Inventors: Sundarraman Balasubramanian, Paris (FR); Alistair M. McFarlane, Uxbridge (GB); Nordine Kadri, Paris (FR); Vijay Venkataraman, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/239,206

(22) Filed: Apr. 23, 2021

(65) Prior Publication Data

US 2021/0345203 A1 Nov. 4, 2021

(30) Foreign Application Priority Data

Apr. 30, 2020 (FR) .................................. 2004292

(51) Int. Cl.
*H04W 4/00* (2018.01)
*H04W 36/00* (2009.01)
*H04W 60/04* (2009.01)
*H04W 88/06* (2009.01)

(52) U.S. Cl.
CPC . *H04W 36/00835* (2018.08); *H04W 36/0069* (2018.08); *H04W 36/0085* (2018.08); *H04W 60/04* (2013.01); *H04W 88/06* (2013.01)

(58) Field of Classification Search
CPC ......... H04W 36/0005; H04W 36/0011; H04W 36/0069; H04W 36/0083; H04W 36/00835; H04W 36/00837; H04W 36/0085; H04W 36/0088; H04W 36/0094; H04W 60/04; H04W 88/06
See application file for complete search history.

(56) References Cited

U.S. PATENT DOCUMENTS

| | | | | |
|---|---|---|---|---|
| 10,292,037 | B1 * | 5/2019 | Gailloux | H04W 4/02 |
| 2016/0127055 | A1 * | 5/2016 | Dayal | H04L 5/0085 |
| | | | | 370/252 |
| 2016/0212603 | A1 * | 7/2016 | Chen | H04W 4/90 |
| 2017/0311266 | A1 * | 10/2017 | Yang | H04W 52/0254 |

(Continued)

OTHER PUBLICATIONS

3GPP TS 38.304 , "3rd Generation Partnership Project; Technical Specification Group Radio Access Network; NR—' User Equipment (UE) procedures in Idle mode and RRC Inactive state (Release 16)", V16.0.0, Mar. 2020, 38 pages.

*Primary Examiner* — Matthew W Genack
(74) *Attorney, Agent, or Firm* — Dorsey & Whitney LLP

(57) ABSTRACT

Systems and methods are disclosed for de-prioritizing an LTE anchor cell based on NR cell measurements. A UE may register on a first cell of a first Radio Access Technology (RAT), process a configuration message from a network prioritizing an anchor band of the first RAT, perform a first cell reselection from the first cell to a second cell of the first RAT that is in the anchor band, and perform cell measurements on one or more cells of a second RAT. In response to determining that none of the cell measurements for the one or more cells of the second RAT exceeds a threshold, the UE de-prioritizes the second cell in ranked cell prioritization data and performs a second cell reselection from the second cell of the first RAT to another cell of the first RAT based on the ranked cell prioritization data.

20 Claims, 6 Drawing Sheets

(56) References Cited

U.S. PATENT DOCUMENTS

| | | | |
|---|---|---|---|
| 2018/0167828 A1* | 6/2018 | Xu | H04W 16/30 |
| 2019/0281507 A1 | 9/2019 | Rahat et al. | |
| 2019/0327655 A1 | 10/2019 | Lee et al. | |
| 2019/0373523 A1* | 12/2019 | Panchai | H04L 5/0098 |
| 2021/0153087 A1* | 5/2021 | Lee | H04W 4/90 |

* cited by examiner

DE-PRIORITIZING LTE ANCHOR CELL BASED ON NR CELL MEASUREMENTS

TECHNICAL FIELD

This application relates generally to wireless communication systems, and more specifically to de-prioritization of LTE anchor cells.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, but may potentially be extended to cover potential new spectrum offerings from 410 MHz to 7125 MHz. Frequency Range 2 (FR2) may include frequency bands from 24.25 GHz to 52.6 GHz. Bands in the millimeter wave (mmWave) range of FR2 may provide smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
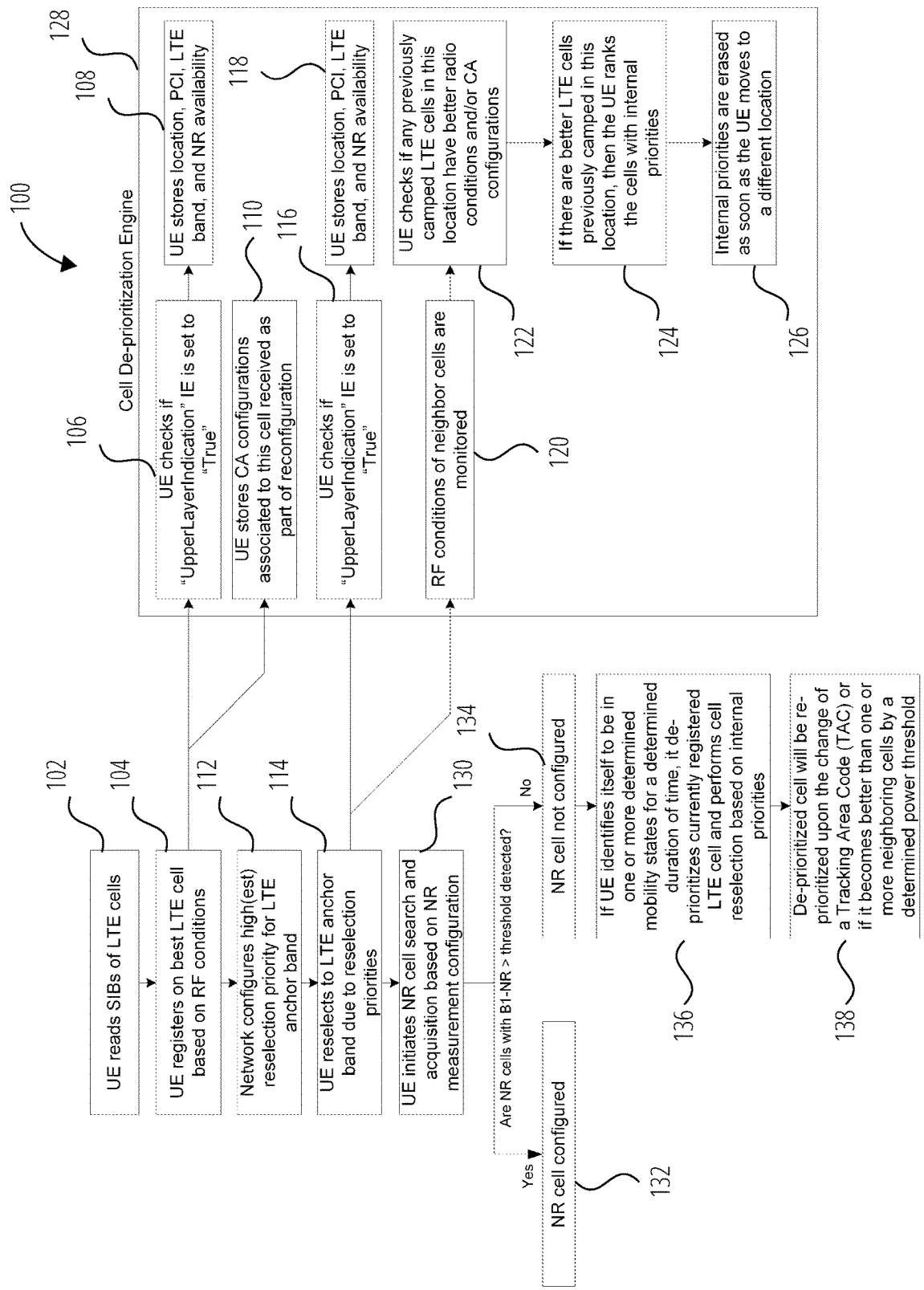
FIG. 1 illustrates a method for de-prioritizing an LTE anchor cell at a UE, according to an embodiment.

In some implementations of E-UTRAN New Radio Dual Connectivity (EN-DC), a network may use an anchor band in a first RAT. In these instances, the network may choose certain bands/frequencies of the first RAT to be a Master Cell Group (MCG), on top of which a Secondary Cell Group (SCG) may be configured on the second RAT. In these cases, it may be that the first RAT is an LTE RAT and that the second RAT is a 5G NR RAT, but other combinations of RAT types are contemplated.

It may be in these networks that, for example, a 5G capable network may tend to (or be configured to) push NR capable UEs to an LTE anchor band(s) and then configure the UE with the EN-DC on both LTE and NR. An LTE anchor band may be a band that is set aside and/or configured by the network for this purpose. As used herein, an anchor cell may be a cell that is operating within the anchor band and being used for this purpose.

In these scenarios, it may be the case that a UE is connected with poor coverage on the LTE anchor band. It may also be the case that the UE is in poor NR coverage. In this case, the UE may be restricted to low throughputs because the NR SCG may not be configured on top of the anchor LTE band due to the poor NR coverage, and the UE is accordingly restricted to coverage by the single LTE carrier (with bad radio conditions) in the anchor band.

For example, some carriers deploying 5G have planned networks such that there is a single LTE anchor band (e.g., LTE band 28 in France). Due to this implementation, networks may push the UE to obtain NR services by first provisioning a high (in some cases, highest) priority cell reselection corresponding to LTE band 28 and signaling it to UE through a radio resource control (RRC) Connection Release message. Due to this, UE receives a high(est) reselection priority for LTE band 28 and thus moves to a cell in LTE band 28. In this example, band 28 has been selected by way of example and not by way of limitation—in other implementations, another band may be similarly used.

Once the UE moves to the anchor band (band 28), the UE receives an NR Measurement Configuration message from the network and starts measuring NR cells. However, due to poor NR coverage at the UE's location, it may be that no NR cell can meet a B1-NR threshold (where a B1 event indicates that a neighbor RAT becomes better than a threshold). Since the B1-NR threshold is not met, the UE is unable to trigger a Multi-RAT Dual Connectivity (MR-DC) measurement report to the network. Accordingly, zero NR cells are configured/activated as part of the EN-DC SCG for the UE. Further, as described above, it may be that in addition to the unavailable NR SCG, the UE is also at a location where LTE band 28 coverage is not good. It may be that the UE is stuck at band 28 and is unable to reselect to other LTE bands with (possibly) better coverage due to the cell reselection priorities configuration by the network in favor of band 28 due to its anchor band capabilities.

The following example deals with a "ping-ponging" issue that may arise under the above circumstances, where the UE constantly loops through multiple RATs.

First, a UE selects a best LTE cell based on radio conditions and initiates an Attach procedure. The user of the UE may then perform some data transfer using the UE, and the network may configure 4CA (i.e., Carrier Aggregation using 4 carriers) on LTE, due to which the UE gets a throughput close to, for example, 300 Mbps. After the completion of the data transfer, the network initiates an RRC Release procedure that includes a high(est) priority for the anchor LTE band 28.

In response, the UE reselects to a cell in LTE band 28 and reads System Information Block (SIB) 2, which has an "UpperLayerIndication-r15" Information Element (IE) Set to "True." The UE may then indicate a 5G icon on the User Interface (UI) of the UE to the user of the UE.

The user of the UE may now initiate a second data transfer, and as part of this process the UE may trigger a service request to the network. In response, the network may provide a measurement configuration for the UE to use to search for and report to the network on one or more NR cells if they satisfy the reporting threshold (e.g., a B1-NR threshold).

The UE performs the measurements on one or more NR cells and identifies that none of the NR cell measurements satisfy the B1-NR threshold. Accordingly, the UE does not trigger an MR-DC report to the network. As a result, zero NR cells are configured/activated as part of the EN-DC SCG for the UE. Further, because the network is configured to have the UE use LTE band 28, the UE is now "stuck" to LTE band 28 even though there may be better LTE cells available as handover between InterFrequency LTE Bands may not be possible due to the required measurement criteria not being satisfied.

Then, as part of a measurement process, the UE may detect one or more UMTS cells to be of acceptable signal quality and accordingly reports an EVENT-B2 to the network. The network may reply by triggering a "MobilityFromEutraCommand" message to the UE to move the UE to a target UMTS cell. The UE may then move to the target UMTS cell and continue the second data transfer.

After the completion of the second data transfer, the UE may again reselect to a good coverage LTE cell (e.g., on LTE band 20) but, due to the reselection priorities of the network discussed above, the UE may then proceed to reselect to a cell on LTE band 28. In other words, the UE falls into another loop of behavior similar to that described above.

Accordingly, it may be that the UE continuously ping-pongs between different RAT and within different LTE bands while never getting true 5G. This ping-ponging may result in higher energy consumption at the UE as it goes through this process over and over. This higher energy use may result in relatively poorer battery life, which a user of the UE may associate with poor performance. This process may also result in much of the second data transfer happening on a UMTS cell, which may not reach the 5G (or even LTE) speeds the user of the UE (which is 5G capable) might expect.

Accordingly, it may be desirable for the UE to de-prioritize the LTE anchor cell in certain 5G scenarios. This de-prioritization may be applied when various conditions are satisfied. One such condition may be that the UE is in a determined mobility state corresponding to no and/or low mobility (e.g., a stationary state and/or a pedestrian state). Another such condition may be that the UE receives measurement configurations for one or more NR cells from the network. Another such condition may be that none of the NR cells at the location of the UE can satisfy a B1-NR threshold. Another such condition may be that neighboring LTE cells (of either the same band or a different band) are better than the current LTE anchor cell. Another such condition may be that Secondary Cells (SCells) for Carrier Aggregation are not configured by the network for use on the current (anchor) LTE cell.

FIG. 1 illustrates a method 100 for de-prioritizing an LTE anchor cell at a UE, according to an embodiment.

The functions 128 of the cell de-prioritization engine may result in the creation and/or modification of a relative ranking of various known LTE cells at a given location. This ranking data may be referred to herein as ranked cell prioritization data. The rankings in the ranked cell prioritization data may correspond to the internal priorities discussed below. For example, the fact that an anchor cell has been de-prioritized within the UE's internal priorities may be reflected by a lower ranking of this anchor cell relative to other cells also ranked in the ranked cell prioritization data.

In block 102, a UE reads the SIBs of one or more LTE cells. In block 104, the UE then registers on the best LTE cell based on RF conditions. After the UE registers on the best LTE cell in block 104, the UE proceeds to perform the functions of block 106 through block 110 as described below.

In block 106, the UE checks if an "UpperLayerIndication" IE is set to true. If the UE determines as part of block 106 that an "UpperLayerIndication" IE is set to true, the UE, in block 108, stores its current location, its current Physical Cell Identifier (PCI), the LTE band it is currently on, and the availability of one or more NR cells at its current location.

In block 110, the UE also stores CA configurations associated with the current cell that were received based on reconfiguration.

The UE then proceeds to block 112. In block 112, the network then configures a highest reselection priority for the LTE anchor band. In block 114, the UE then reselects to the LTE anchor band due to the network reselection priorities. After the UE reselects to the LTE anchor band in block 114, the UE proceeds to perform the functions of block 116 through block 126 as described below.

In block 116, the UE checks if an "UpperLayerIndication" IE is set to true. If the UE determines as part of block 116 that an "UpperLayerIndication" IE is set to true, the UE proceeds to block 118 and stores its current location, its current PCI, the LTE band it is currently on, and the availability of one or more NR cells at its current location.

In some embodiments, the "UpperLayerIndication" of block 106 and block 116 may indicate to a UE that is on the given LTE cell that the network is configured with NR cells that are co-located with the LTE cell. Thus, the "UpperLayerIndication" indicates to the UE that the network supports non-standalone (NSA) EN-DC operation. An indication of "True" for the "UpperLayerIndication" may be a prerequisite for the given LTE cell to be ranked within the ranked cell prioritization data, or it may be used to provide a higher ranking to the given LTE cell within the ranked cell prioritization data.

In some embodiments, the information stored in block 108 and block 118 (e.g., UE location, PCI, LTE band, and/or NR availability) may be used when ranking the given LTE cells within the ranked cell prioritization data. For example, the UE location, PCI, and LTE band of a given LTE cell may be used to help identify the LTE cell that is being ranked. The NR availability information may be used to determine whether to rank an LTE cell within the ranked cell prioritization data at all, or may be used to rank an LTE cell higher based on an indication that NR is available at that cell.

In block 120, the UE also monitors RF conditions of neighbor cells. From there, the UE may then proceed to block 122 and check if any previously camped LTE cells in this location have better radio conditions and/or CA configurations than the current cell. If there are better LTE cells previously camped in this location, the UE proceeds to block 124 and rank the known cells with internal priorities. The UE may later erase these internal priorities when the UE is moved to a different location by proceeding to block 126.

In some embodiments, the UE may check the RF conditions of the neighbor cells in block 120 in order to determine whether one or more of the neighbor cells is better than the current cell. This may be a pre-condition for de-prioritizing the current (anchor) cell (as described above).

In some embodiments, at block 122 the UE may detect the current radio conditions at the previously camped LTE cells in order to make its determination regarding whether a previously camped LTE cell has better radio conditions than the current LTE cell. A previously camped cell may have better radio conditions when, for example, a signal power of a carrier of the previously camped cell is better than a signal power of a carrier of the current cell. Further, the UE may use previously gathered information about CA configurations in order to make a determination regarding whether a previously camped LTE cell has a better CA configuration than the current LTE cell. A better CA configuration may be a CA configuration that uses more carriers than a CA configuration at the current cell. These previously stored CA configurations may include one or more CA configurations gathered as part of block 110 described above.

It may be that in block 122 and block 124, a cell may be considered better than the current LTE cell if it has either (or both) of better radio conditions and a better CA configuration than the current cell.

The UE then proceeds to block 130 and initiates an NR cell search and acquisition based on NR measurement configuration. If NR cells are detected (and, in some cases, if the NR cells detected meet or exceed a determined B1-NR threshold), the UE proceeds to block 132 and an NR cell is configured for use with the UE, and the process ends.

If NR cells are not detected (and/or none of the NR cell(s) that are detected meet or exceed a determined B1-NR threshold), the UE instead proceeds to block 134, and no NR cell(s) are configured for use with the UE.

From block 134, the UE eventually proceeds to block 136 and identifies that it has been in one or more determined mobility states for a determined duration of time, and in response it may de-prioritize the currently registered (camped) LTE cell and perform cell reselection based on the internal priorities. In other words, the UE may reselect to a cell that is selected from the ranked cell prioritization data (e.g., a previously camped cell). In some embodiments, the functions 128 of a cell de-prioritization engine may occur prior to the UE proceeding to block 136, such that when the anchor cell is de-prioritized as part of block 136, the ranked cell prioritization data resulting from the functions 128 is ready for use in performing the cell reselection of block 136.

In some embodiments, the one or more determined mobility states of block 136 may be selected from a group of standards-defined mobility states. For example, the one or more mobility states may be mobility states as defined by the International Mobile Telecommunications-202 (IMT-2020) standard, which defines a stationary mobility state, a pedestrian mobility state, a vehicular mobility state, and a high-speed vehicular state. It may be that in some embodiments, the one or more determined mobility states include a stationary state. In other embodiments, the one or more determined mobility states may include a stationary state and a pedestrian state.

In some embodiments, the determined duration of time of block 136 may be an amount of time that is useful for ensuring that the UE is not within one of the determined mobility states on only a very temporary basis. For example, this duration of time may be, for example, 10 seconds, 30 seconds, 6 minutes, or an hour. Other time durations are contemplated.

At some later point, the UE proceeds to block 138, where the de-prioritized cell may be re-prioritized within the UE's internal priorities in response to a change of a Tracking Area Code (TAC) at the UE or if the de-prioritized cell becomes better than one or more neighboring cells by a determined power threshold.

In some embodiments, the determined power threshold of block 138 may be a power threshold that is sufficient to ensure that there is a significant difference in received power at the de-prioritized cell as compared to the cell that was previously reselected to in block 136. For example, this power threshold may be a difference of 10 dBm, 15 dBm, or 20 dBm. Other power threshold amounts are contemplated.

While FIG. 1 has been discussed in relation to LTE cells and NR cells, it is contemplated that other RAT types may be substituted for one or both of these cell types as appropriate, depending on network configuration.

An example of how this process may occur follows. A UE selects an LTE cell based on favorable radio conditions found at the cell. The network then triggers an RRC Release with high(est) priority reselection corresponding to LTE band 28 (which is the network's configured LTE anchor band). The UE then reselects to (camp on a cell in) LTE band 28.

The UE then performs NR cell measurements based on measurement configurations. In this case, none of these NR cell measurements satisfy a determined B1-NR threshold, leading to a determination at the UE of the non-availability of NR cell coverage at this location.

The UE then de-prioritizes the current LTE cell on band 28 within the UE's internal priorities. This de-prioritization may be based on a determination that the pre-requisites for de-prioritization are present. For example, it may be that the UE is in a determined mobility state corresponding to no and/or low mobility. It may also be that the UE has received measurement configurations for one or more NR cells. It may also be that none of these NR cells satisfy a B1-NR threshold. It may also be that neighboring LTE cells (of either the same band or a different band) are better than the current LTE anchor cell. It may also be that SCells for CA are not configured by the network for use on the current LTE cell.

The UE then performs cell reselection using the internal priorities, and a different LTE cell (e.g., an LTE cell not on the anchor band, band 28) is selected for use by the UE, despite the network's preference that the UE use a cell in anchor band 28.

In some embodiments, the UE making such a reselection based on internal priorities may fingerprint its current location (e.g., latitude and longitude) relative to anchor cell performance, thereby not reselecting to such a cell (despite network indicated preferences) in future iterations.

The disclosed methods of de-prioritizing an LTE anchor cell at a UE may have various benefits. The UE may avoid unnecessary hand-overs to different RATs, and may also avoid a large number of reselections within different LTE bands. The use of the disclosed de-prioritization methods may reduce overhead signaling due to reducing multiple measurement reports which may be triggered in every used band at a given rate. Further, the UE may end up on a better LTE cell relative to a cell of the anchor band, rather than being camped on a poor anchor LTE cell with no (or poor) 5G coverage.

Figure 2:
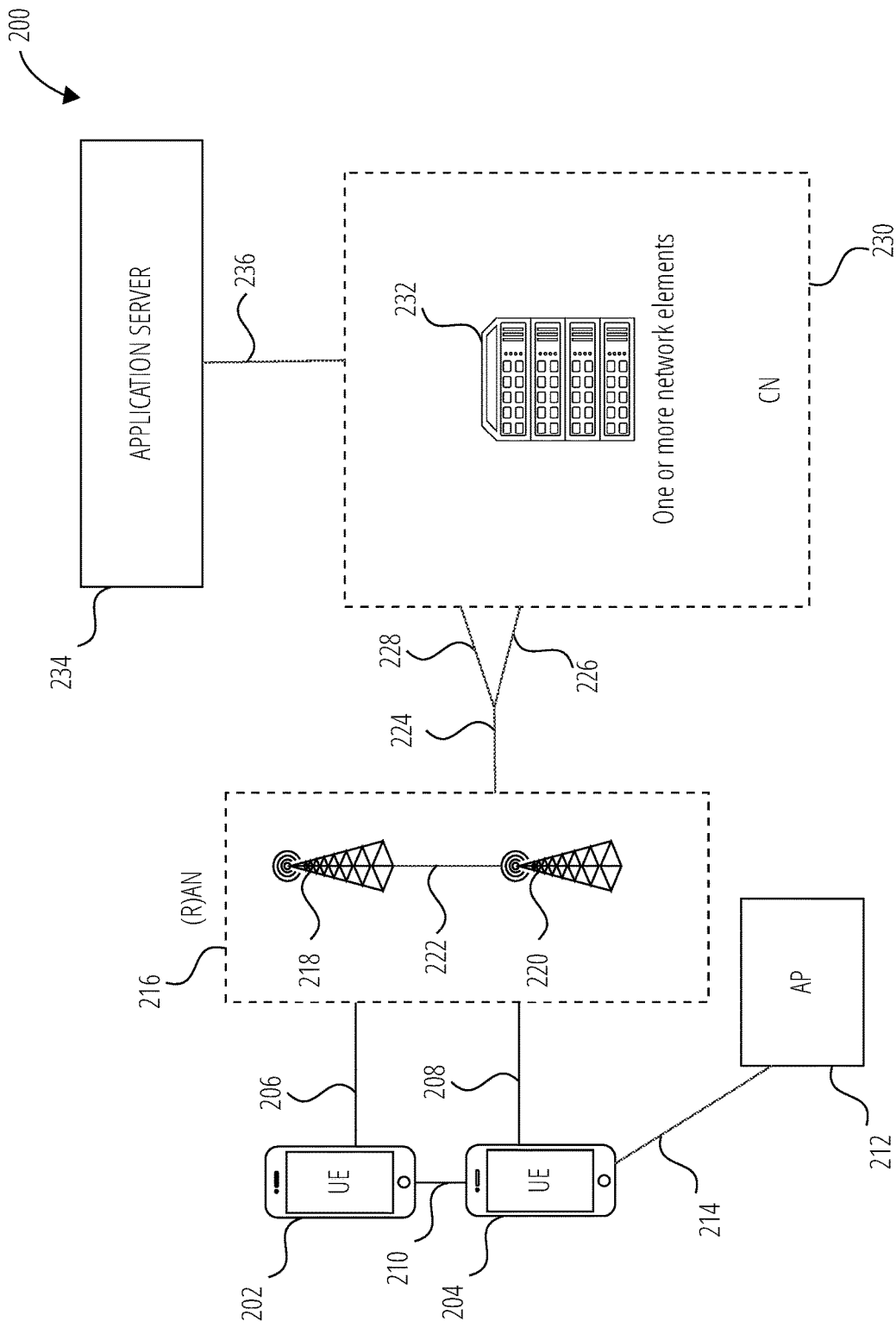
FIG. 2 illustrates a system in accordance with one embodiment.

FIG. 2 illustrates an example architecture of a system 200 of a network, in accordance with various embodiments. The following description is provided for an example system 200 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 2, the system 200 includes UE 202 and UE 204. In this example, the UE 202 and the UE 204 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI) devices, in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management Systems (EEMS), electronic/engine control units (ECUs), electronic/engine control modules (ECMs), embedded systems, microcontrollers, control modules, engine management systems (EMS), networked or "smart" appliances, MTC devices, M2M devices, IoT devices, and/or the like.

In some embodiments, the UE 202 and/or the UE 204 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 202 and UE 204 may be configured to connect, for example, communicatively couple, with an access node or radio access node (shown as (R)AN 216). In embodiments, the (R)AN 216 may be an NG RAN or an 5G RAN, an E-UTRAN, or a legacy RAN, such as a UTRAN or GERAN. As used herein, the term "NG RAN" or the like may refer to a (R)AN 216 that operates in an NR or 5G system, and the term "E-UTRAN" or the like may refer to a (R)AN 216 that operates in an LTE or 4G system. The UE 202 and UE 204 utilize connections (or channels) (shown as connection 206 and connection 208, respectively), each of which comprises a physical communications interface or layer (discussed in further detail below).

In this example, the connection 206 and connection 208 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, an 5G protocol, an NR protocol, and/or any of the other communications protocols discussed herein. In embodiments, the UE 202 and UE 204 may directly exchange communication data via a ProSe interface 210. The ProSe interface 210 may alternatively be referred to as a sidelink (SL) interface 210 and may comprise one or more logical channels, including but not limited to a PSCCH, a PSSCH, a PSDCH, and a PSBCH.

The UE 204 is shown to be configured to access an AP 212 (also referred to as "WLAN node," "WLAN," "WLAN Termination," "WT" or the like) via connection 214. The connection 214 can comprise a local wireless connection, such as a connection consistent with any IEEE 802.11 protocol, wherein the AP 212 would comprise a wireless fidelity (Wi-Fi®) router. In this example, the AP 212 may be connected to the Internet without connecting to the core network of the wireless system (described in further detail below). In various embodiments, the UE 204, (R)AN 216, and AP 212 may be configured to utilize LWA operation and/or LWIP operation. The LWA operation may involve the UE 204 in RRC_CONNECTED being configured by the RAN node 218 or the RAN node 220 to utilize radio resources of LTE and WLAN. LWIP operation may involve the UE 204 using WLAN radio resources (e.g., connection 214) via IPsec protocol tunneling to authenticate and encrypt packets (e.g., IP packets) sent over the connection 214. IPsec tunneling may include encapsulating the entirety of original IP packets and adding a new packet header, thereby protecting the original header of the IP packets.

The (R)AN 216 can include one or more AN nodes, such as RAN node 218 and RAN node 220, that enable the connection 206 and connection 208. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs, TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or 5G system (for example, a gNB), and the term "E-UTRAN node" or the like may refer to a RAN node that operates in an LTE or 4G system 200 (e.g., an eNB). According to various embodiments, the RAN node 218 or RAN node 220 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 218 or RAN node 220 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 218 or RAN node 220); a MAC/PHY split wherein RRC, PDCP, RLC, and MAC layers are operated by the CRAN/vBBUP and the PHY layer is operated by individual RAN nodes (e.g., RAN node 218 or RAN node 220); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 218 or RAN node 220 to perform other virtualized applications. In some implementations, an individual RAN node may represent individual gNB-DUs that are connected to a gNB-CU via individual F1 interfaces (not shown by FIG. 2). In these implementations, the gNB-DUs may include one or more remote radio heads or RFEMs, and the gNB-CU may be operated by a server that is located in the (R)AN 216 (not shown) or by a server pool in a similar manner as the CRAN/vBBUP. Additionally, or alternatively, one or more of the RAN node 218 or RAN node 220 may be next generation eNBs (ng-eNBs), which are RAN nodes that provide E-UTRA user plane and control plane protocol terminations toward the UE 202 and UE 204, and are connected to an 5GC via an NG interface (discussed infra). In V2X scenarios one or more of the RAN node 218 or RAN node 220 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, and media, as well as applications/software to sense and control ongoing vehicular and pedestrian traffic. The RSU may operate on the 5.9 GHz Direct Short Range Communications (DSRC) band to provide very low latency communications required for high-speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 218 and/or the RAN node 220 can terminate the air interface protocol and can be the first point of contact for the UE 202 and UE 204. In some embodiments, the RAN node 218 and/or the RAN node 220 can fulfill various logical functions for the (R)AN 216 including, but not limited to, radio network controller (RNC) functions such as radio bearer management, uplink and downlink dynamic radio resource management and data packet scheduling, and mobility management.

In embodiments, the UE 202 and UE 204 can be configured to communicate using OFDM communication signals with each other or with the RAN node 218 and/or the RAN node 220 over a multicarrier communication channel in accordance with various communication techniques, such as, but not limited to, an OFDMA communication technique (e.g., for downlink communications) or an SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 218 and/or the RAN node 220 to the UE 202 and UE 204, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 202 and UE 204 and the RAN node 218 and/or the RAN node 220 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 202 and UE 204 and the RAN node 218 or RAN node 220 may operate using LAA, eLAA, and/or feLAA mechanisms. In these implementations, the UE 202 and UE 204 and the RAN node 218 or RAN node 220 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 202 and UE 204, RAN node 218 or RAN node 220, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 202, AP 212, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and an MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz, and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 202 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 202 and UE 204. The PDCCH carries information about the transport format and resource allocations related to the PDSCH channel, among other things. It may also inform the UE 202 and UE 204 about the transport format, resource allocation, and HARQ information related to the uplink shared channel. Typically, downlink scheduling (assigning control and shared channel resource blocks to the UE 204 within a cell) may be performed at any of the RAN node 218 or RAN node 220 based on channel quality information fed back from any of the UE 202 and UE 204. The downlink resource assignment information may be sent on the PDCCH used for (e.g., assigned to) each of the UE 202 and UE 204.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as EREGs. An ECCE may have other numbers of EREGs in some situations.

The RAN node 218 or RAN node 220 may be configured to communicate with one another via interface 222. In embodiments where the system 200 is an LTE system (e.g., when CN 230 is an EPC), the interface 222 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from an MeNB to an SeNB; information about successful in sequence delivery of PDCP PDUs to a UE 202 from an SeNB for user data; information of PDCP PDUs that were not delivered to a UE 202; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 200 is an 5G or NR system (e.g., when CN 230 is an SGC), the interface 222 may be an Xn interface. The Xn interface is defined between two or more RAN nodes (e.g., two or more gNBs and the like) that connect to SGC, between a RAN node 218 (e.g., a gNB) connecting to SGC and an eNB, and/or between two eNBs connecting to 5GC (e.g., CN 230). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality; functionality to manage the Xn-C interface; and mobility support for UE 202 in a connected mode (e.g., CM-CONNECTED) including functionality to manage the UE mobility for connected mode between one or more RAN node 218 or RAN node 220. The mobility support may include context transfer from an old (source) serving RAN node 218 to new (target) serving RAN node 220, and control of user plane tunnels between old (source) serving RAN node 218 to new (target) serving RAN node 220. A protocol stack of the Xn-U may include a transport network layer built on an Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be the same as or similar to the user plane and/or control plane protocol stack(s) shown and described herein.

The (R)AN 216 is shown to be communicatively coupled to a core network—in this embodiment, CN 230. The CN 230 may comprise one or more network elements 232, which are configured to offer various data and telecommunications services to customers/subscribers (e.g., users of UE 202 and UE 204) who are connected to the CN 230 via the (R)AN 216. The components of the CN 230 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 230 may be referred to as a network slice, and a logical instantiation of a portion of the CN 230 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 234 may be an element offering applications that use IP bearer resources with the core network (e.g., UMTS PS domain, LTE PS data services, etc.). The application server 234 can also be configured to support one or more communication services (e.g., VoIP sessions, PTT sessions, group communication sessions, social networking services, etc.) for the UE 202 and UE 204 via the EPC. The application server 234 may communicate with the CN 230 through an IP communications interface 236.

In embodiments, the CN 230 may be an SGC, and the (R)AN 116 may be connected with the CN 230 via an NG interface 224. In embodiments, the NG interface 224 may be split into two parts, an NG user plane (NG-U) interface 226, which carries traffic data between the RAN node 218 or RAN node 220 and a UPF, and the S1 control plane (NG-C) interface 228, which is a signaling interface between the RAN node 218 or RAN node 220 and AMFs.

In embodiments, the CN 230 may be a SG CN, while in other embodiments, the CN 230 may be an EPC. Where CN 230 is an EPC, the (R)AN 116 may be connected with the CN 230 via an S1 interface 224. In embodiments, the S1 interface 224 may be split into two parts, an S1 user plane (S1-U) interface 226, which carries traffic data between the RAN node 218 or RAN node 220 and the S-GW, and the S1-MME interface 228, which is a signaling interface between the RAN node 218 or RAN node 220 and MMEs.

In certain embodiments, 5G system architecture supports data connectivity and services enabling deployments to use techniques such as Network Function Virtualization and Software Defined Networking. The 5G system architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by a point-to-point reference point (e.g., N11) between any two network functions (e.g., AMF and SMF).

Figure 3:
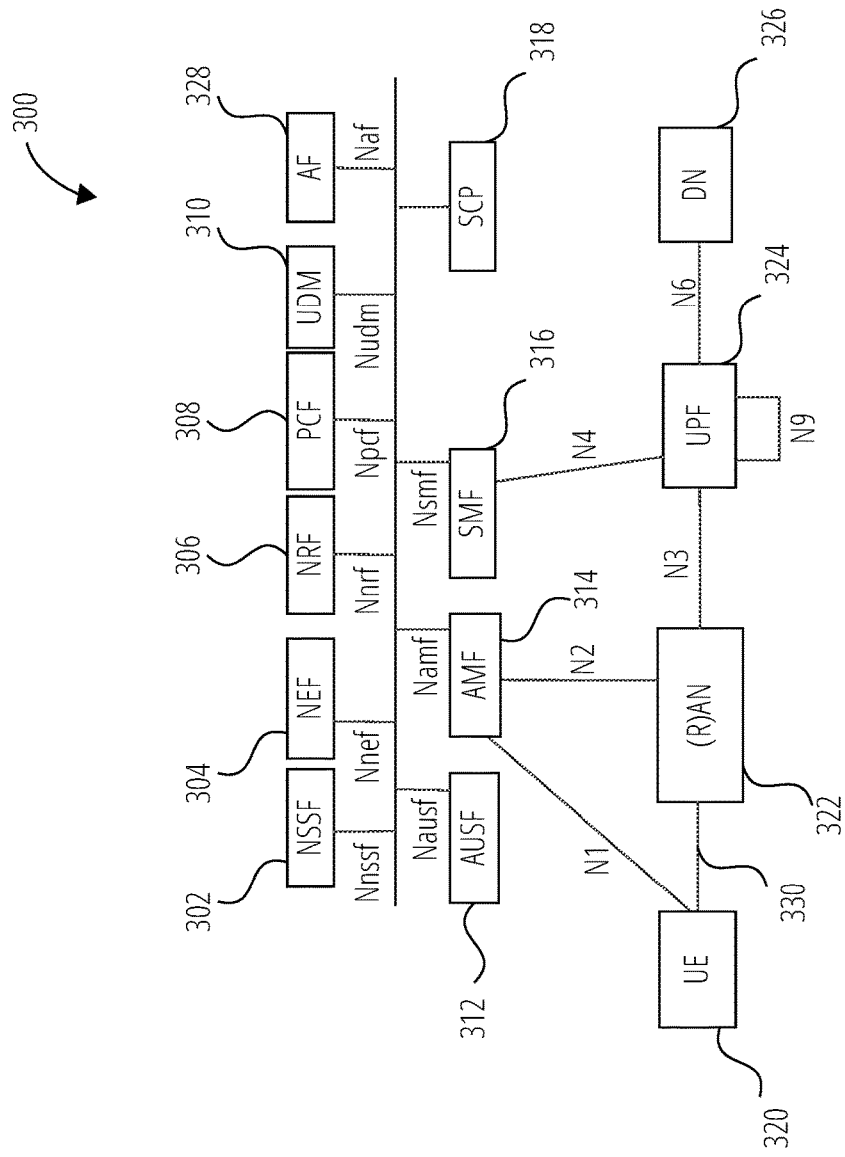
FIG. 3 illustrates an example of service based architecture in accordance with certain embodiments.

FIG. 3 illustrates an example of service based architecture 300 in 5GS according to one embodiment. As described in 3GPP TS 23.501, the service based architecture 300 comprises NFs such as an NSSF 302, a NEF 304, an NRF 306, a PCF 308, a UDM 310, an AUSF 312, an AMF 314, and an SMF 316, for communication with a UE 320, a (R)AN 322, a UPF 324, and a DN 326. The NFs and NF services can communicate directly, referred to as Direct Communication, or indirectly via a SCP 318, referred to as Indirect Communication. FIG. 3 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 3 are described below.

The NSSF 302 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 304 supports exposure of capabilities and events. NF capabilities and events may be securely exposed by the NEF 304 (e.g., for third-party Application Functions, and/or Edge Computing). The NEF 304 may store/retrieve information as structured data using a standardized interface (Nudr) to a UDR. The NEF 304 may also secure provision of information from an external application to a 3GPP network and may provide for the Application Functions to securely provide information to the 3GPP network (e.g., expected UE behavior, 5GLAN group information, and service specific information), wherein the NEF 304 may authenticate and authorize and assist in throttling the Application Functions. The NEF 304 may provide translation of internal-external information by translating between information exchanged with the AF and information exchanged with the internal network function. For example, the NEF 304 translates between an AF-Service-Identifier and internal 5G Core information such as DNN and S-NSSAI. The NEF 304 may handle masking of network and user sensitive information to external AFs according to the network policy. The NEF 304 may receive information from other network functions (based on exposed capabilities of other network functions), and stores the received information as structured data using a standardized interface to a UDR. The stored information can be accessed and re-exposed by the NEF 304 to other network functions and Application Functions, and used for other purposes such as analytics. For external exposure of services related to specific UE(s), the NEF 304 may reside in the HPLMN. Depending on operator agreements, the NEF 304 in the HPLMN may have interface(s) with NF(s) in the VPLMN. When a UE is capable of switching between EPC and 5GC, an SCEF+NEF may be used for service exposure.

The NRF 306 supports service discovery function by receiving an NF Discovery Request from an NF instance or SCP and providing the information of the discovered NF instances to the NF instance or SCP. The NRF 306 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 308 supports a unified policy framework to govern network behavior. The PCF 308 provides policy rules to Control Plane function(s) to enforce them. The PCF 308 accesses subscription information relevant for policy decisions in a Unified Data Repository (UDR). The PCF 308 may access the UDR located in the same PLMN as the PCF.

The UDM 310 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 310 uses subscription data (including authentication data) that may be stored in a UDR, in which case a UDM implements the application logic and may not require an internal user data storage, and several different UDMs may serve the same user in different transactions. The UDM 310 may be located in the HPLMN of the subscribers it serves, and may access the information of the UDR located in the same PLMN.

The AF 328 interacts with the core network to provide services that, for example, support the following: application influence on traffic routing; accessing the NEF 304; interacting with the policy framework for policy control; and/or IMS interactions with 5GC. Based on operator deployment, Application Functions considered to be trusted by the operator can be allowed to interact directly with relevant Network Functions. Application Functions not allowed by the operator to access directly the Network Functions may use the external exposure framework via the NEF 304 to interact with relevant Network Functions.

The AUSF 312 supports authentication for 3GPP access and untrusted non-3GPP access. The AUSF 312 may also provide support for Network Slice-Specific Authentication and Authorization.

The AMF 314 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 314. Regardless of the number of network functions, in certain embodiments there is only one NAS interface instance per access network between the UE and the CN, terminated at one of the network functions that implements at least NAS security and Mobility Management. The AMF 314 may also include policy related functionalities.

In addition to the functionalities described above, the AMF 314 may include the following functionality to support non-3GPP access networks: support of N2 interface with N3IWF/TNGF, over which some information (e.g., 3GPP Cell Identification) and procedures (e.g., handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a non-3GPP access; and/or support dedicated CM management contexts for the UE for connectivity over non-3GPP access. Not all of the above functionalities may be required to be supported in an instance of a Network Slice.

The SMF 316 supports Session Management (e.g., Session Establishment, modify and release, including tunnel maintain between UPF and AN node), UE IP address allocation and management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 316 may include policy related functionalities.

The SCP 318 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 318 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 320 may include a device with radio communication capabilities. For example, the UE 320 may comprise a smartphone (e.g., handheld touchscreen mobile computing devices connectable to one or more cellular networks). The UE 320 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 320 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 320 may be configured to connect or communicatively couple with the (R)AN 322 through a radio interface 330, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, an NR protocol, and the like. For example, the UE 320 and the (R)AN 322 may use a Uu interface (e.g., an LTE-Uu interface) to exchange control plane data via a protocol stack comprising a PHY layer, a MAC layer, an RLC layer, a PDCP layer, and an RRC layer. A DL transmission may be from the (R)AN 322 to the UE 320 and a UL transmission may be from the UE 320 to the (R)AN 322. The UE 320 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 322 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 322 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 322) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 320 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 324 may act as an anchor point for intra-RAT and inter-RAT mobility, an external PDU session point of interconnect to the DN 326, and a branching point to support multi-homed PDU session. The UPF 324 may also perform packet routing and forwarding, packet inspection, enforce user plane part of policy rules, lawfully intercept packets (UP collection); traffic usage reporting, perform QoS handling for user plane (e.g., packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 324 may include an uplink classifier to support routing traffic flows to a data network. The DN 326 may represent various network operator services, Internet access, or third-party services. The DN 326 may include, for example, an application server.

Multi-Radio Dual Connectivity (MR-DC) is a generalization of Intra-E-UTRA Dual Connectivity (DC), where a multiple Rx/Tx capable UE may be configured to utilize resources provided by two different nodes connected via non-ideal backhaul, one providing NR access and the other one providing either E-UTRA or NR access. One node may act as a Master Node (MN) and the other may act as a Secondary Node (SN). The MN and SN may be connected via a network interface, and at least the MN is connected to the core network. The MN and/or the SN may be operated with shared spectrum channel access.

In certain embodiments, functions specified for a UE may be used for an Integrated Access and Backhaul-Mobile Termination (IAB-MT) unless otherwise stated. Similar to UE, the IAB-MT can access the network using either one network node or using two different nodes with E-UTRA-NR Dual Connectivity (EN-DC) and NR-NR Dual Connectivity (NR-DC) architectures. In EN-DC, the backhauling traffic over the E-UTRA radio interface may not be supported. MR-DC may be designed based on the assumption of non-ideal backhaul between the different nodes but can also be used in case of ideal backhaul.

Figure 4:
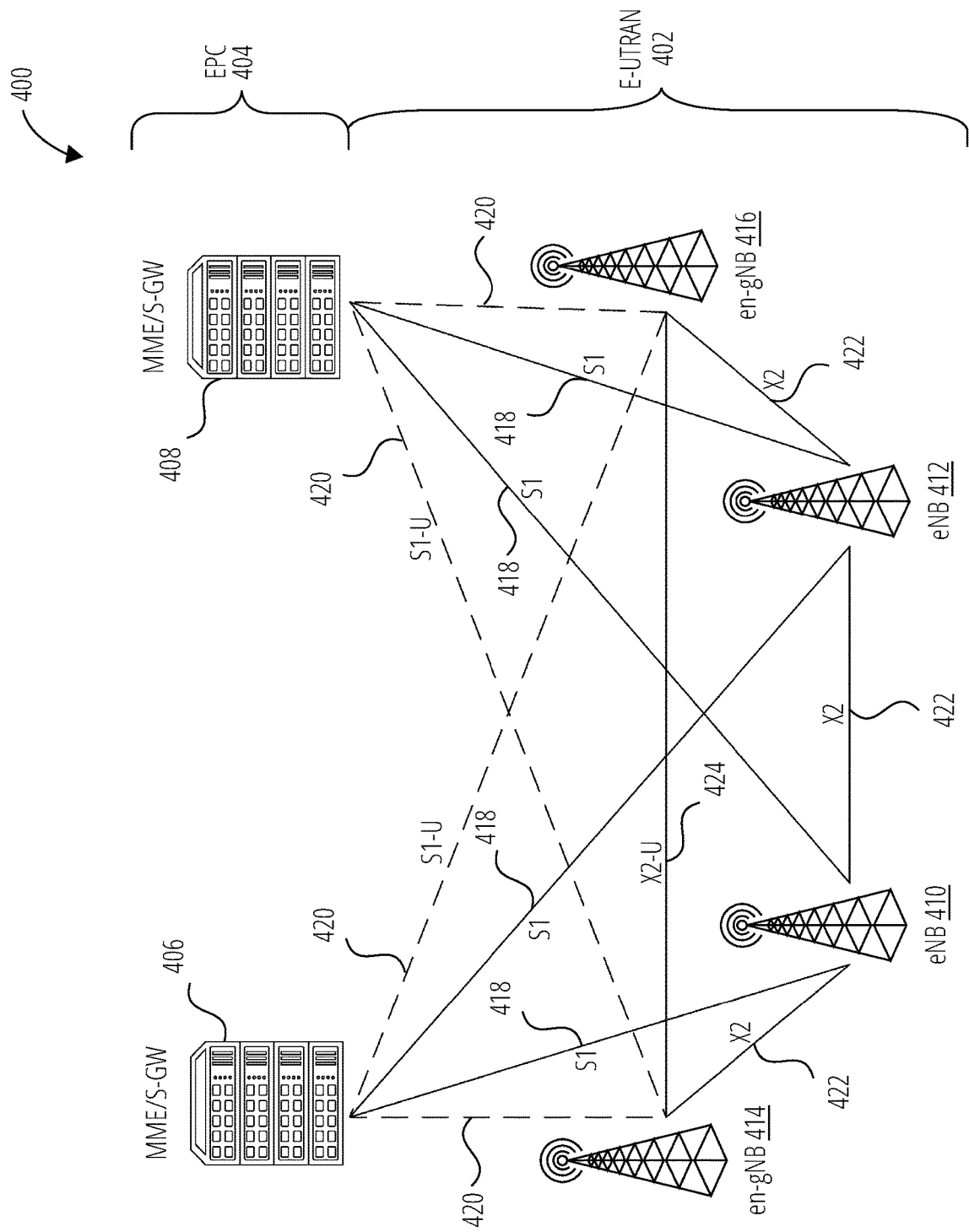
FIG. 4 illustrates an EN-DC architecture according to embodiments herein.

FIG. 4 illustrates an EN-DC architecture 400 according to embodiments herein. The EN-DC architecture 400 includes an E-UTRAN 402 and an EPC 404. The E-UTRAN 402 supports MR-DC via EN-DC, in which a UE is connected to one eNB that acts as an MN and one en-gNB that acts as an SN. An en-gNB may be a node that provides NR user plane and control plane protocol terminations towards the UE, and may act as an SN in EN-DC. In FIG. 4, the EPC 404 may comprise one or more Mobility Management Entity/Serving Gateways (MME/S-GWs), such as an MME/S-GW 406 and an MME/S-GW 408. By way of example, the E-UTRAN 402 may comprise an eNB 410, an eNB 412, an en-gNB 414, and an en-gNB 416. Each of the eNB 410 and the eNB 412 may be connected to the EPC 404 via one or more S1 interfaces 418 and to one or more en-gNBs via one or more X2 interfaces 422. Each of the en-gNB 414 and the en-gNB 416 may be connected to the EPC 404 via one or more S1-U interfaces 420. The en-gNB 414 and the en-gNB 416 may be connected to one another through an X2-U interface 424.

The EN-DC architecture 400 of FIG. 4 is an example of an EN-DC architecture that may be used in conjunctions with EN-DC embodiments using anchor cells as discussed herein.

In certain implementations, NG-RAN supports NG-RAN E-UTRA-NR Dual Connectivity (NGEN-DC), in which a UE is connected to one ng-eNB that acts as an MN and one gNB that acts as an SN.

In certain implementations, NG-RAN supports NR-E-UTRA Dual Connectivity (NE-DC), in which a UE is connected to one gNB that acts as an MN and one ng-eNB that acts as an SN.

In certain implementations, NG-RAN supports NR-NR Dual Connectivity (NR-DC), in which a UE is connected to one gNB that acts as an MN and another gNB that acts as an SN. In addition, NR-DC can also be used when a UE is connected to two gNB-DUs, one serving the MCG and the other serving the SCG, connected to the same gNB-CU, acting both as an MN and as an SN.

Figure 5:
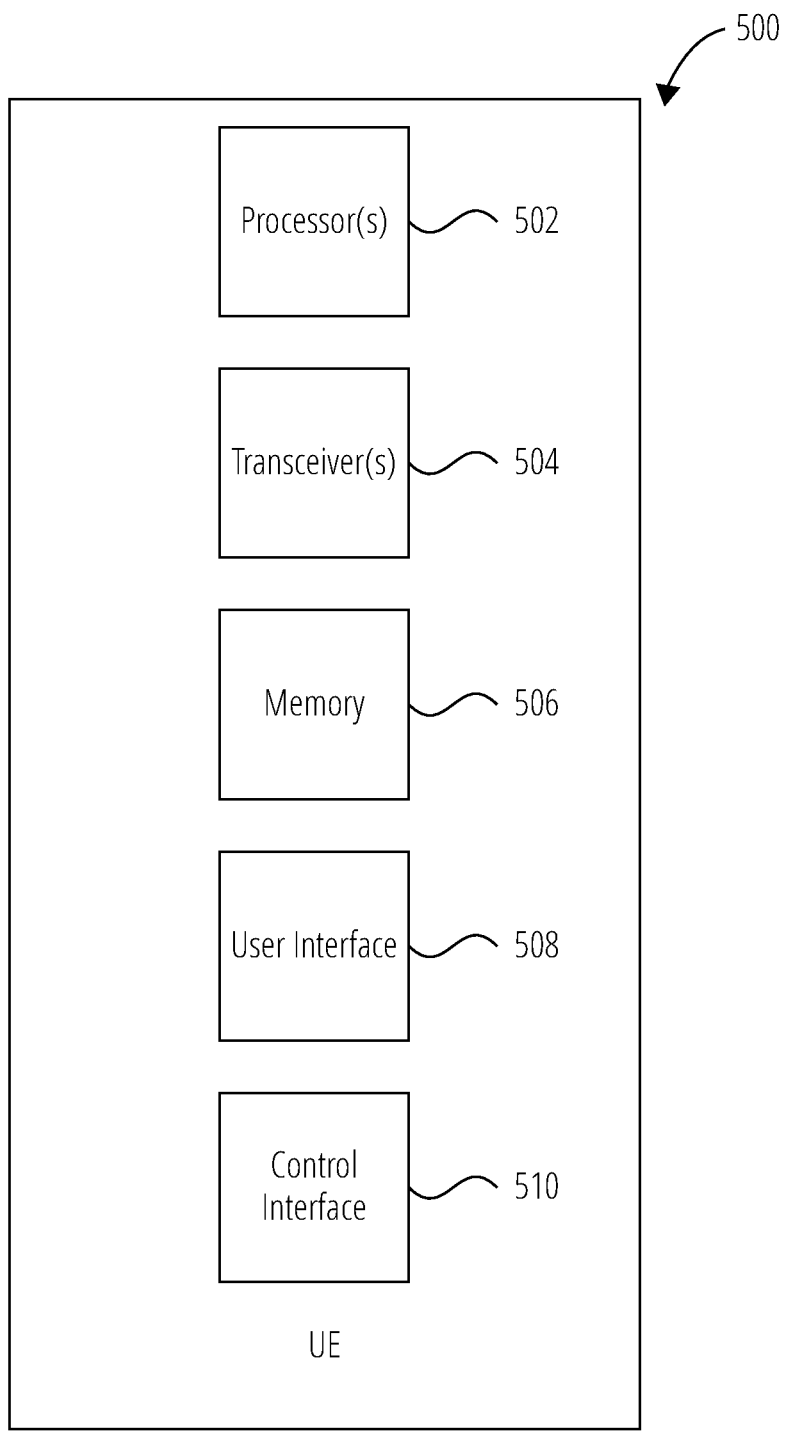
FIG. 5 illustrates a UE in accordance with one embodiment.

FIG. 5 is a block diagram of an example UE 500 configurable according to various embodiments of the present disclosure, including by execution of instructions on a computer-readable medium that correspond to any of the example methods and/or procedures described herein. The UE 500 comprises one or more processor 502, transceiver 504, memory 506, user interface 508, and control interface 510.

The one or more processor 502 may include, for example, an application processor, an audio digital signal processor, a central processing unit, and/or one or more baseband processors. Each of the one or more processor 502 may include internal memory and/or may include interface(s) to communication with external memory (including the memory 506). The internal or external memory can store software code, programs, and/or instructions for execution by the one or more processor 502 to configure and/or facilitate the UE 500 to perform various operations, including operations described herein. For example, execution of the instructions can configure the UE 500 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 504, user interface 508, and/or control interface 510. As another example, the one or more processor 502 may execute program code stored in the memory 506 or other memory that corresponds to MAC, RLC, PDCP, and RRC layer protocols standardized by 3GPP (e.g., for NR and/or LTE).

As a further example, the processor 502 may execute program code stored in the memory 506 or other memory that, together with the one or more transceiver 504, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 506 may comprise memory area for the one or more processor 502 to store variables used in protocols, configuration, control, and other functions of the UE 500, including operations corresponding to, or comprising, any of the example methods and/or procedures described herein. Moreover, the memory 506 may comprise non-volatile memory (e.g., flash memory), volatile memory (e.g., static or dynamic RAM), or a combination thereof. Furthermore, the memory 506 may interface with a memory slot by which removable memory cards in one or more formats (e.g., SD Card, Memory Stick, Compact Flash, etc.) can be inserted and removed.

The one or more transceiver 504 may include radio-frequency transmitter and/or receiver circuitry that facilitates the UE 500 to communicate with other equipment supporting like wireless communication standards and/or protocols. For example, the one or more transceiver 504 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 502. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 504 includes a transmitter and a receiver that enable device 1200 to communicate with various 5G/NR networks according to various protocols and/or methods proposed for standardization by 3GPP and/or other standards bodies. For example, such functionality can operate cooperatively with the one or more processor 502 to implement a PHY layer based on OFDM, OFDMA, and/or SC-FDMA technologies, such as described herein with respect to other figures.

The user interface 508 may take various forms depending on particular embodiments, or can be absent from the UE 500. In some embodiments, the user interface 508 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 500 may comprise a tablet computing device including a larger touchscreen display. In such embodiments, one or more of the mechanical features of the user interface 508 may be replaced by comparable or functionally equivalent virtual user interface features (e.g., virtual keypad, virtual buttons, etc.) implemented using the touchscreen display, as familiar to persons of ordinary skill in the art. In other embodiments, the UE 500 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 500 having a touch screen display are capable of receiving user inputs, such as inputs related to exemplary methods and/or procedures described herein or otherwise known to persons of ordinary skill in the art.

In some exemplary embodiments of the present disclosure, the UE 500 may include an orientation sensor, which can be used in various ways by features and functions of the UE 500. For example, the UE 500 can use outputs of the orientation sensor to determine when a user has changed the physical orientation of the UE 500's touch screen display. An indication signal from the orientation sensor can be available to any application program executing on the UE 500, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 510 may take various forms depending on particular embodiments. For example, the control interface 510 may include an RS-232 interface, an RS-485 interface, a USB interface, an HDMI interface, a Bluetooth interface, an IEEE ("Firewire") interface, an $I^2C$ interface, a PCMCIA interface, or the like. In some exemplary embodiments of the present disclosure, control interface 1260 can comprise an IEEE 802.3 Ethernet interface such as described above. In some embodiments of the present disclosure, the control interface 510 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 500 may include more functionality than is shown in FIG. 5 including, for example, a video and/or still-image camera, microphone, media player and/or recorder, etc. Moreover, the one or more transceiver 504 may include circuitry for communication using additional radio-frequency communication standards including Bluetooth, GPS, and/or others. Moreover, the one or more processor 502 may execute software code stored in the memory 506 to control such additional functionality. For example, directional velocity and/or position estimates output from a GPS receiver can be available to any application program executing on the UE 500, including various exemplary methods and/or computer-readable media according to various exemplary embodiments of the present disclosure.

Figure 6:
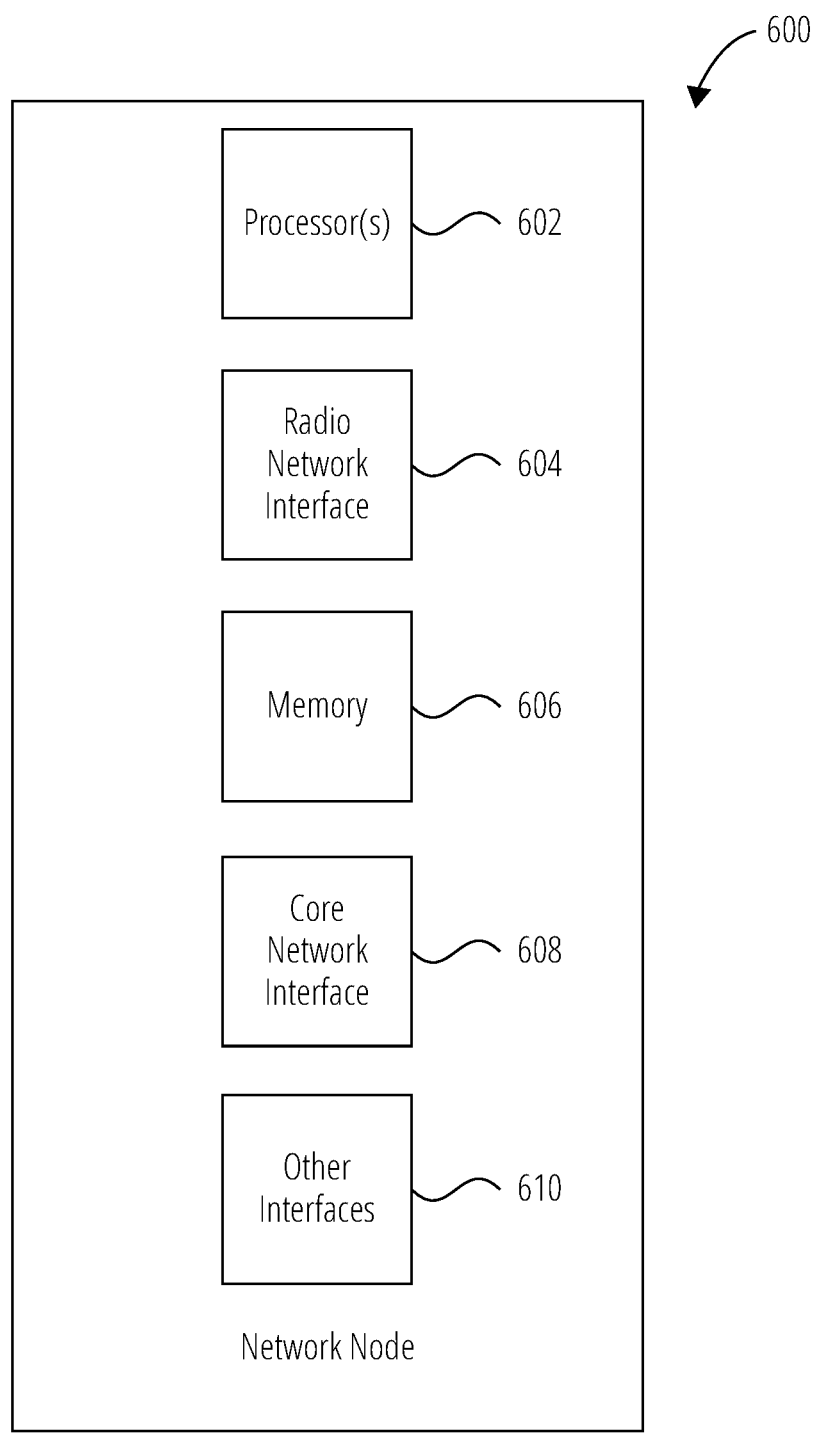
FIG. 6 illustrates a network node in accordance with one embodiment.

FIG. 6 is a block diagram of an example network node 600 configurable according to various embodiments of the present disclosure, including by execution of instructions on a computer-readable medium that correspond to any of the example methods and/or procedures described herein.

The network node 600 includes a one or more processor 602, a radio network interface 604, a memory 606, a core network interface 608, and other interfaces 610. The network node 600 may comprise, for example, a base station, eNB, gNB, access node, or component thereof.

The one or more processor 602 may include any type of processor or processing circuitry and may be configured to perform any of the methods or procedures disclosed herein. The memory 606 may store software code, programs, and/or instructions executed by the one or more processor 602 to configure the network node 600 to perform various operations, including operations described herein. For example, execution of such stored instructions can configure the network node 600 to communicate with one or more other devices using protocols according to various embodiments of the present disclosure, including one or more methods and/or procedures discussed above. Furthermore, execution of such stored instructions can also configure and/or facilitate the network node 600 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 604 and the core network interface 608. By way of example and without limitation, the core network interface 608 comprise an S1 interface and the radio network interface 604 may comprise a Uu interface, as standardized by 3GPP. The memory 606 may also store variables used in protocols, configuration, control, and other functions of the network node 600. As such, the memory 606 may comprise non-volatile memory (e.g., flash memory, hard disk, etc.), volatile memory (e.g., static or dynamic RAM), network-based (e.g., "cloud") storage, or a combination thereof.

The radio network interface 604 may include transmitters, receivers, signal processors, ASICs, antennas, beamforming units, and other circuitry that enables network node 600 to communicate with other equipment such as, in some embodiments, a plurality of compatible user equipment (UE). In some embodiments, the network node 600 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 604 may include a PHY layer based on OFDM, OFDMA, and/or SC-FDMA technologies. In some embodiments, the functionality of such a PHY layer can be provided cooperatively by the radio network interface 604 and the one or more processor 602.

The core network interface 608 may include transmitters, receivers, and other circuitry that enables the network node 600 to communicate with other equipment in a core network such as, in some embodiments, circuit-switched (CS) and/or packet-switched (PS) core networks. In some embodiments, the core network interface 608 may include the S1 interface standardized by 3GPP. In some embodiments, the core network interface 608 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 608 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 610 may include transmitters, receivers, and other circuitry that enables the network node 600 to communicate with external networks, computers, databases, and the like for purposes of operations, administration, and maintenance of the network node 600 or other network equipment operably connected thereto.

For one or more embodiments, at least one of the components set forth in one or more of the preceding figures may be configured to perform one or more operations, techniques, processes, and/or methods as set forth in the Examples Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the Examples Section.

Examples Section

The following examples pertain to further embodiments.

Example 1 is a computing apparatus of a user equipment (UE), comprising a processor and a memory storing instructions that, when executed by the processor, configure the UE to: register on a first cell of a first Radio Access Technology (RAT) based on Radio Frequency (RF) conditions of the first cell; process a configuration message from a network prioritizing an anchor band of the first RAT; perform a first cell reselection from the first cell to a second cell of the first RAT that is in the anchor band in response to processing the configuration message; perform cell measurements on one or more cells of a second RAT; determine that none of the cell measurements for the one or more cells of the second RAT exceeds a threshold; de-prioritize, based on the determination that none of the cell measurements for the one or more cells of the second RAT exceeds the threshold, the second cell in ranked cell prioritization data in the memory; and perform a second cell reselection from the second cell of the first RAT to another cell of the first RAT, the second cell reselection based on the ranked cell prioritization data.

Example 2 is the computing apparatus of Example 1, wherein the first RAT is an Evolved UMTS (Universal Mobile Telecommunications Service) Terrestrial Radio Access Network (E-UTRAN) RAT and the second RAT is a New Radio (NR) RAT, and wherein the second cell reselection is performed in response to a determination that the UE has been in one or more of a stationary mobility state and a pedestrian mobility state for at least a pre-determined duration.

Example 3 is the computing apparatus of any of Examples 1-2, wherein the instructions, when executed by the processor, further configure the UE to monitor RF conditions of one or more neighbor cells of the second cell; and wherein the second cell reselection is performed in response to a determination that the one or more neighbor cells has better RF conditions than the second cell.

Example 4 is the computing apparatus of any of Examples 1-3, wherein the second cell reselection is performed in response to a determination that carrier aggregation (CA) is not configured for the second cell.

Example 5 is the computing apparatus of any of Examples 1-4, wherein the instructions, when executed by the processor, further configure the UE to store one or more of a current location of the UE, a Physical Cell Identifier (PCI) for the first cell, LTE band information for the first cell, and NR availability for the first cell.

Example 6 is the computing apparatus of any of Examples 1-5, wherein the instructions, when executed by the processor, further configure the UE to store one or more of a current location of the UE, a Physical Cell Identifier (PCI) for the second cell, LTE band information for the second cell, and NR availability for the second cell.

Example 7 is the computing apparatus of any of Examples 1-6, wherein the instructions, when executed by the processor, further configure the UE to rank a previously camped cell within the ranked cell prioritization data.

Example 8 is the computing apparatus of Example 7, wherein the ranking of the previously camped cell is according to a current signal power detected at the previously camped cell.

Example 9 is the computing apparatus of any of Examples 7-8, wherein the ranking of the previously camped cell is according to a carrier aggregation (CA) configuration at the previously camped cell stored at the UE when the UE was registered on the previously camped cell.

Example 10 is the computing apparatus of any of Examples 7-9, wherein the second cell reselection is performed from the second cell to the previously camped cell.

Example 11 is the computing apparatus of any of Examples 7-10, wherein the previously camped cell is the first cell.

Example 12 is the computing apparatus of any of Examples 1-11, wherein the instructions, when executed by the processor, further configure the UE to rank a third cell of the first RAT within the ranked cell prioritization data.

Example 13 is the computing apparatus of any of Examples 1-12, wherein the instructions, when executed by the processor, further configure the UE to erase the ranked cell prioritization data in response to a determination that the UE is no longer in one of a stationary mobility state and a pedestrian mobility state.

Example 14 is the computing apparatus of any of Examples 1-13, wherein the instructions, when executed by the processor, further configure the UE to re-prioritize the second cell in the ranked cell prioritization data based on a determination that a Tracking Area Code (TAC) corresponding to the UE has changed.

Example 15 is the computing apparatus of any of Examples 1-14, wherein the instructions, when executed by the processor, further configure the UE to re-prioritize the second cell in the ranked cell prioritization data based on a determination that a received signal power corresponding to the second cell exceeds a received signal power of each of one or more neighbor cells of the second cell by at least a pre-determined threshold.

Example 16 is the computing apparatus of any of Examples 1-15, wherein the instructions, when executed by the processor, further configure the UE to store, in the memory, an indication that the second cell reselection was performed and a location of the UE when the second cell reselection was performed.

Example 17 is a method of a user equipment (UE) comprising: registering on a first cell of a first Radio Access Technology (RAT) based on Radio Frequency (RF) conditions of the first cell; processing a configuration message from a network prioritizing an anchor band of the first RAT; performing a first cell reselection from the first cell to a second cell of the first RAT that is in the anchor band in response to processing the configuration message; performing cell measurements on one or more cells of a second RAT; determining that none of the cell measurements for the one or more cells of the second RAT exceeds a threshold; de-prioritizing, based on the determination that none of the cell measurements for the one or more cells of the second RAT exceeds the threshold, the second cell in ranked cell prioritization data of an internal memory of the UE; and performing a second cell reselection from the second cell of the first RAT to another cell of the first RAT, the second cell reselection based on the ranked cell prioritization data.

Example 18 is the method of Example 17, wherein the first RAT is an Evolved UMTS (Universal Mobile Telecommunications Service) Terrestrial Radio Access Network (E-UTRAN) RAT and the second RAT is a New Radio (NR) RAT, and wherein the second cell reselection is performed in response to a determination that the UE has been in one or more of a stationary mobility state and a pedestrian mobility state for at least a pre-determined duration.

Example 19 is the method of any of Examples 17-18, further comprising monitoring RF conditions of one or more neighbor cells of the second cell; wherein the second cell reselection is performed in response to a determination that the one or more neighbor cells has better RF conditions than the second cell.

Example 20 is the method of any of Examples 17-19, wherein the second cell reselection is performed in response to a determination that carrier aggregation (CA) is not configured for the second cell.

Example 21 is the method of any of Examples 17-20, further comprising storing one or more of a current location of the UE, a Physical Cell Identifier (PCI) for the first cell, LTE band information for the first cell, and NR availability for the first cell.

Example 22 is the method of any of Examples 17-21, further comprising storing one or more of a current location of the UE, a Physical Cell Identifier (PCI) for the second cell, LTE band information for the second cell, and NR availability for the second cell.

Example 23 is the method of any of Examples 17-22, further comprising ranking a previously camped cell within the ranked cell prioritization data.

Example 24 is the method of Example 23, wherein the ranking of the previously camped cell is according to a current signal power detected at the previously camped cell.

Example 25 is the method of any of Examples 23-24, wherein the ranking of the previously camped cell is according to a carrier aggregation (CA) configuration at the previously camped cell stored at the UE when the UE was registered on the previously camped cell.

Example 26 is the method of any of Examples 23-25, wherein the second cell reselection is performed from the second cell to the previously camped cell.

Example 27 is the method of any of Examples 23-26, wherein the previously camped cell is the first cell.

Example 28 is the method of any of Examples 17-27, further comprising ranking a third cell of the first RAT within the ranked cell prioritization data.

Example 29 is the method of any of Examples 17-28, further comprising erasing the ranked cell prioritization data in response to a determination that the UE is no longer in one of a stationary mobility state and a pedestrian mobility state.

Example 30 is the method of any of Examples 17-29, further comprising re-prioritizing the second cell in the ranked cell prioritization data based on a determination that a Tracking Area Code (TAC) corresponding to the UE has changed.

Example 31 is the method of any of Examples 17-30, further comprising re-prioritizing the second cell in the ranked cell prioritization data based on a determination that a received signal power corresponding to the second cell exceeds a received signal power of each of one or more neighbor cells of the second cell by at least a pre-determined threshold.

Example 32 is the method of any of Examples 17-31, further comprising storing, in the internal memory of the UE, an indication that the second cell reselection was performed and a location of the UE when the second cell reselection was performed.

Example 33 is a non-transitory computer-readable storage medium, the computer-readable storage medium including instructions that, when executed by a computer, cause the computer to: register the UE on a first cell of a first Radio Access Technology (RAT) based on Radio Frequency (RF) conditions of the first cell; process a configuration message from a network prioritizing an anchor band of the first RAT; cause the UE to perform a first cell reselection from the first cell to a second cell of the first RAT that is in the anchor band in response to processing the configuration message; perform cell measurements on one or more cells of a second RAT; determine that none of the cell measurements for the one or more cells of the second RAT exceeds a threshold; de-prioritize, based on the determination that none of the cell measurements for the one or more cells of the second RAT exceeds the threshold, the second cell in ranked cell prioritization data; and cause the UE to perform a second cell reselection from the second cell of the first RAT to another cell of the first RAT, the second cell reselection based on the ranked cell prioritization data.

Example 34 is the non-transitory computer-readable storage medium of Example 33, wherein the first RAT is an Evolved UMTS (Universal Mobile Telecommunications Service) Terrestrial Radio Access Network (E-UTRAN) RAT and the second RAT is a New Radio (NR) RAT, and wherein the second cell reselection is performed in response to a determination that the UE has been in one or more of a stationary mobility state and a pedestrian mobility state for at least a pre-determined duration.

Example 35 is the non-transitory computer-readable storage medium of any of Examples 33-34, wherein the instructions, when executed by the computer, further cause the computer to monitor RF conditions of one or more neighbor cells of the second cell; and wherein the second cell reselection is performed in response to a determination that the one or more neighbor cells has better RF conditions than the second cell.

Example 36 is the non-transitory computer-readable storage medium of any of Examples 33-35, wherein the second cell reselection is performed in response to a determination that carrier aggregation (CA) is not configured for the second cell.

Example 37 is the non-transitory computer-readable storage medium of any of Examples 33-36, wherein the instructions, when executed by the computer, further cause the computer to store one or more of a current location of the UE, a Physical Cell Identifier (PCI) for the first cell, LTE band information for the first cell, and NR availability for the first cell.

Example 38 is the non-transitory computer-readable storage medium of any of Examples 33-37, wherein the instructions, when executed by the computer, further cause the computer to store one or more of a current location of the UE, a Physical Cell Identifier (PCI) for the second cell, LTE band information for the second cell, and NR availability for the second cell.

Example 39 is the non-transitory computer-readable storage medium of any of Examples 33-38, wherein the instructions, when executed by the computer, further cause the computer to rank a previously camped cell within the ranked cell prioritization data.

Example 40 is the non-transitory computer-readable storage medium of Example 39, wherein the ranking of the previously camped cell is according to a current signal power detected at the previously camped cell.

Example 41 is the non-transitory computer-readable storage medium of any of Examples 39-40, wherein the ranking of the previously camped cell is according to a carrier aggregation (CA) configuration at the previously camped cell stored in a memory of the UE when the UE was registered on the previously camped cell.

Example 42 is the non-transitory computer-readable storage medium of any of Examples 39-41, wherein the second cell reselection is performed from the second cell to the previously camped cell.

Example 43 is the non-transitory computer-readable storage medium of any of Examples 39-42, wherein the previously camped cell is the first cell.

Example 44 is the non-transitory computer-readable storage medium of any of Examples 33-43, wherein the instructions, when executed by the computer, further cause the computer to rank a third cell of the first RAT within the ranked cell prioritization data.

Example 45 is the non-transitory computer-readable storage medium of any of Examples 33-44, wherein the instructions, when executed by the computer, further cause the computer to erase the ranked cell prioritization data in response to a determination that the UE is no longer in one of a stationary mobility state and a pedestrian mobility state.

Example 46 is the non-transitory computer-readable storage medium of any of Examples 33-45, wherein the instructions, when executed by the computer, further configure the computer to re-prioritize the second cell in the ranked cell prioritization data based on a determination that a Tracking Area Code (TAC) corresponding to the UE has changed.

Example 47 is the non-transitory computer-readable storage medium of any of Examples 33-46, wherein the instructions, when executed by the computer, further cause the computer to re-prioritize the second cell in the ranked cell prioritization data based on a determination that a received signal power corresponding to the second cell exceeds a received signal power of each of one or more neighbor cells of the second cell by at least a pre-determined threshold.

Example 48 is the non-transitory computer-readable storage medium of any of Examples 33-47, wherein the instructions, when executed by the computer, further cause the computer to store, in a memory of the UE, an indication that the second cell reselection was performed and a location of the UE when the second cell reselection was performed.

Example 49 may include an apparatus comprising means to perform one or more elements of a method described in or related to any of the above Examples, or any other method or process described herein.

Example 50 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 51 may include an apparatus comprising logic, modules, or circuitry to perform one or more elements of a method described in or related to any of the above Examples, or any other method or process described herein.

Example 52 may include a method, technique, or process as described in or related to any of the above Examples, or portions or parts thereof.

Example 53 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 54 may include a signal as described in or related to any of the above Examples, or portions or parts thereof.

Example 55 may include a datagram, packet, frame, segment, protocol data unit (PDU), or message as described in or related to any of the above Examples, or portions or parts thereof, or otherwise described in the present disclosure.

Example 56 may include a signal encoded with data as described in or related to any of the above Examples, or portions or parts thereof, or otherwise described in the present disclosure.

Example 57 may include a signal encoded with a datagram, packet, frame, segment, PDU, or message as described in or related to any of the above Examples, or portions or parts thereof, or otherwise described in the present disclosure.

Example 58 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 59 may include a computer program comprising instructions, wherein execution of the program by a processing element is to cause the processing element to carry out the method, techniques, or process as described in or related to any of the above Examples, or portions thereof.

Example 60 may include a signal in a wireless network as shown and described herein.

Example 61 may include a method of communicating in a wireless network as shown and described herein.

Example 62 may include a system for providing wireless communication as shown and described herein.

Example 63 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a user equipment (UE) comprising:
   registering on a first cell of a first Radio Access Technology (RAT) based on Radio Frequency (RF) conditions of the first cell;
   processing a configuration message from a network prioritizing an anchor band of the first RAT;
   performing a first cell reselection from the first cell to a second cell of the first RAT that is in the anchor band in response to processing the configuration message;
   performing cell measurements on one or more cells of a second RAT;
   determining that none of the cell measurements for the one or more cells of the second RAT exceeds a threshold;
   de-prioritizing, based on the determination that none of the cell measurements for the one or more cells of the second RAT exceeds the threshold, the second cell of the first RAT in ranked cell prioritization data of an internal memory of the UE; and
   performing a second cell reselection from the second cell of the first RAT to another cell of the first RAT, the second cell reselection based on the ranked cell prioritization data.

2. The method of claim 1, wherein the first RAT is an Evolved UMTS (Universal Mobile Telecommunications Service) Terrestrial Radio Access Network (E-UTRAN) RAT and the second RAT is a New Radio (NR) RAT, and wherein the second cell reselection is performed in response to a determination that the UE has been in one or more of a stationary mobility state and a pedestrian mobility state for at least a pre-determined duration.

3. The method of claim 1, further comprising monitoring RF conditions of one or more neighbor cells of the second cell; wherein the second cell reselection is performed in response to a determination that the one or more neighbor cells has better RF conditions than the second cell.

4. The method of claim 1, wherein the second cell reselection is performed in response to a determination that carrier aggregation (CA) is not configured for the second cell.

5. The method of claim 1, further comprising one or more of:
    storing one or more of a current location of the UE, a Physical Cell Identifier (PCI) for the first cell, LTE band information for the first cell, and NR availability for the first cell; and/or
    storing one or more of a current location of the UE, a Physical Cell Identifier (PCI) for the second cell, LTE band information for the second cell, and NR availability for the second cell.

6. The method of claim 1, further comprising ranking a previously camped cell within the ranked cell prioritization data.

7. The method of claim 6, wherein the ranking of the previously camped cell is according to a current signal power detected at the previously camped cell.

8. The method of claim 6, wherein the ranking of the previously camped cell is according to a carrier aggregation (CA) configuration at the previously camped cell stored at the UE when the UE was registered on the previously camped cell.

9. The method of claim 6, wherein the second cell reselection is performed from the second cell to the previously camped cell.

10. The method of claim 9, wherein the previously camped cell is the first cell.

11. The method of claim 1, further comprising ranking a third cell of the first RAT within the ranked cell prioritization data.

12. The method of claim 1, further comprising at least one of:
    erasing the ranked cell prioritization data in response to a determination that the UE is no longer in one of a stationary mobility state and a pedestrian mobility state; and/or
    re-prioritizing the second cell in the ranked cell prioritization data based on a determination that a Tracking Area Code (TAC) corresponding to the UE has changed; and/or
    re-prioritizing the second cell in the ranked cell prioritization data based on a determination that a received signal power corresponding to the second cell exceeds a received signal power of each of one or more neighbor cells of the second cell by at least a pre-determined threshold.

13. The method of claim 1, further comprising storing, in the internal memory of the UE, an indication that the second cell reselection was performed and a location of the UE when the second cell reselection was performed.

14. A user equipment (UE), comprising:
    a processor; and
    a memory storing instructions that, when executed by the processor, configure the UE to:
        register on a first cell of a first Radio Access Technology (RAT) based on Radio Frequency (RF) conditions of the first cell;
        process a configuration message from a network prioritizing an anchor band of the first RAT;
        perform a first cell reselection from the first cell to a second cell of the first RAT that is in the anchor band in response to processing the configuration message;
        perform cell measurements on one or more cells of a second RAT;
        determine that none of the cell measurements for the one or more cells of the second RAT exceeds a threshold;
        de-prioritize, based on the determination that none of the cell measurements for the one or more cells of the second RAT exceeds the threshold, the second cell of the first RAT in ranked cell prioritization data in the memory; and
        perform a second cell reselection from the second cell of the first RAT to another cell of the first RAT, the second cell reselection based on the ranked cell prioritization data.

15. The UE of claim 14, wherein the first RAT is an Evolved UMTS (Universal Mobile Telecommunications Service) Terrestrial Radio Access Network (E-UTRAN) RAT and the second RAT is a New Radio (NR) RAT, and wherein the second cell reselection is performed in response to a determination that the UE has been in one or more of a stationary mobility state and a pedestrian mobility state for at least a pre-determined duration.

16. The UE of claim 14, wherein the instructions, when executed by the processor, further configure the UE to monitor RF conditions of one or more neighbor cells of the second cell, and
    wherein the second cell reselection is performed in response to a determination that the one or more neighbor cells has better RF conditions than that of the second cell.

17. The UE of claim 14, wherein the second cell reselection is performed in response to a determination that carrier aggregation (CA) is not configured for the second cell.

18. The UE of claim 14, wherein the instructions, when executed by the processor, further configure the UE to store one or more of a current location of the UE, a Physical Cell Identifier (PCI) for the first cell, LTE band information for the first cell, and NR availability for the first cell.

19. A non-transitory computer-readable storage medium, the computer-readable storage medium including instructions that, when executed by a processor of a user equipment (UE), cause the processor to:
    register the UE on a first cell of a first Radio Access Technology (RAT) based on Radio Frequency (RF) conditions of the first cell;
    process a configuration message from a network prioritizing an anchor band of the first RAT;
    cause the UE to perform a first cell reselection from the first cell to a second cell of the first RAT that is in the anchor band in response to processing the configuration message;
    perform cell measurements on one or more cells of a second RAT;
    determine that none of the cell measurements for the one or more cells of the second RAT exceeds a threshold;
    de-prioritize, based on the determination that none of the cell measurements for the one or more cells of the second RAT exceeds the threshold, the second cell of the first RAT in ranked cell prioritization data; and
    cause the UE to perform a second cell reselection from the second cell of the first RAT to another cell of the first RAT, the second cell reselection based on the ranked cell prioritization data.

20. The non-transitory computer-readable storage medium of claim 19, wherein the first RAT is an Evolved UMTS (Universal Mobile Telecommunications Service) Terrestrial Radio Access Network (E-UTRAN) RAT and the second RAT is a New Radio (NR) RAT, and wherein the second cell reselection is performed in response to a determination that the UE has been in one or more of a stationary mobility state and a pedestrian mobility state for at least a pre-determined duration.

\* \* \* \* \*